United States Patent
Chuang

(10) Patent No.: US 8,593,413 B2
(45) Date of Patent: Nov. 26, 2013

(54) SENSORY STRUCTURE OF CAPACITIVE TOUCH PANEL AND CAPACITIVE TOUCH PANEL HAVING THE SAME

(75) Inventor: Wen Ju Chuang, Hsinchu County (TW)

(73) Assignee: Cando Corporation, Hsinchu County (TW)

( * ) Notice: Subject to any disclaimer, the term of this patent is extended or adjusted under 35 U.S.C. 154(b) by 847 days.

(21) Appl. No.: 12/659,202

(22) Filed: Mar. 1, 2010

(65) Prior Publication Data

US 2011/0210935 A1 Sep. 1, 2011

(51) Int. Cl.
*G06F 3/045* (2006.01)

(52) U.S. Cl.
USPC .......................................... 345/173; 345/174

(58) Field of Classification Search
USPC ............. 345/156–184, 104; 178/18.01–20.04
See application file for complete search history.

(56) References Cited

U.S. PATENT DOCUMENTS

2006/0097991 A1* 5/2006 Hotelling et al. ............. 345/173

* cited by examiner

*Primary Examiner* — Amare Mengistu
*Assistant Examiner* — Jennifer Zubajlo
(74) *Attorney, Agent, or Firm* — Bacon & Thomas, PLLC

(57) ABSTRACT

A two-dimensional sensory structure for the capacitive touch panel is provided. The provided two-dimensional sensory structure includes a substrate having plural first metal structures and second metal structures on a first surface thereof, a dot-like insulating layer located on the substrate and composed of plural insulating dots, and an electrode layer located on the dot-like insulating layer and composed of plural conductive traces. The insulating dots are each corresponding to the first metal structures respectively, and thereby a first part of the conductive traces arranged along a first direction are electrically connected to each other, and the conductive traces that are arranged along a second direction are electrically insulated therefrom. The thickness of the touch panel according to the invention is effectively reduced.

1 Claim, 5 Drawing Sheets

SENSORY STRUCTURE OF CAPACITIVE TOUCH PANEL AND CAPACITIVE TOUCH PANEL HAVING THE SAME

BACKGROUND OF THE INVENTION

1. Field of the Invention

The present invention relates to a sensory structure of touch panel, and more particularly to a sensory structure of capacitive touch panel and a capacitive touch panel having the same.

2. Description of the Related Art

Touch sensing technology is broadly applied in the present electronic application for data input. In this case, the information is read out or transmitted while the user touches the screen with the finger or the stylus, so that the buttons, keyboards or joysticks, which are desired for the conventional electronic apparatus, could be omitted.

Depending on the principles adopted for sensing, the touch panels are grouped into such as resistive touch panels, capacitive touch panels, infrared (IR) touch panels and ultrasonic wave ones. Regarding the IR touch panels and the ultrasonic wave ones, an IR or ultrasonic wave transmitting unit is arranged on one side of the respective X-direction and Y-direction of the screen, and on the other side thereof a receiving unit is configured. The movement of IR-ray or ultrasonic wave would be changed while the screen is touched by the user, and the touch position is accordingly measured and determined for data input. With respect to the resistive touch panel, which is fabricated by the lamination of an upper and a lower indium tin oxide (ITO) conductive films, the voltage variation thereof is generated while the upper and the lower electrodes of ITO are conducted through the touch pressure, and is detected by a controller, so that the touch position for data input is determined. The capacitive touch panel is constructed by the transparent glass substrate with a layer of metal oxide coated thereon, where a uniformly distributed electrical field is produced throughout the surface of the substrate by the application of voltage from the four corners thereof. By detecting the capacitance variation caused by static-electric reaction between the user's finger and the electric field, the touch position for data input is determined.

The capacitive touch panel is advantageous in the design of dust-preventing, anti-fire, anti-scratch and high resolution. Nevertheless, an erroneous determination may occur in case of being exposed to electrostatic or humid environment since the sensory structure of the capacitive touch panel is easily affected thereby. Accordingly, it is relatively more difficult to design the structure and circuitry of the sensory structure to further increase the sensitivity of the capacitive touch panel, and hence the fabrication cost thereof may be so significant.

The sensory electrode of a conventional capacitive touch panel is a sensory matrix of plural sensory structures, wherein each of the sensory structure is usually an ITO unit designed in regular shapes (such as diamond), and it is electrically connected by a single trace between units. In this case, a broken circuit could easily occur due to the problem of trace breaking the electric connection of the sensory structure. Moreover, since the conventional sensory matrix is composed of plural panel sensory structures, besides the use of additional electrode material, the performance of touch panel is also affected by the decreasing of transparency thereof.

Furthermore, because the thickness of touch panel is required thinner, the thickness of cover lens thereof may be reduced so that the wiring or pattern located under the cover lens will become visible, affecting the appearance of the device adopting such touch panel.

For overcoming the mentioned issues, the present invention provides a sensory structure of capacitive touch panel and capacitive touch panel having the same. The novel design of sensory structure accompanied with double trace bridge connection could avoid the broken circuit from single trace failure therein, reduce the use of ITO to decrease the resistance of touch panel, and increase the transparency thereof.

SUMMARY OF THE INVENTION

It is one aspect of the present invention to provide a sensory structure of a touch panel having a bridge structure of double traces to avoid broken circuit of sensory circuit from single trace failure.

It is another aspect of the present invention to provide a touch panel, wherein the sensory structure thereof includes plural mesh-typed sensory structures which are regularly arranged to reduce the use of transparent conductive layer material in the sensory structure, hence increasing the transparency of the touch panel and decreasing the resistance thereof.

According to the mentioned aspects of the present invention, a sensory structure of a touch panel is provided. The provided sensory structure is constructed by plural sensory units, and each thereof includes a first connecting trace and a second connecting trace extending in a first direction and a second direction respectively, an insulator located between the first connecting trace and the second connecting trace to form a bridge structure, a pair of two first mesh-typed sensory structures arranged along the first direction and electrically connected to the first connecting trace at two opposite sides of the bridge structure, and a pair of two second mesh-typed sensory structures arranged along the second direction and electrically connected to the second connecting trace at two opposite sides of the bridge structure. Preferably, the first direction and the second direction are different, and the first connecting trace has a plan width of less than 30 μm.

Preferably, the first mesh-typed sensory structures and the second mesh-typed sensory structures are made of metal.

Preferably, the first mesh-typed sensory structures and the second mesh-typed sensory structures are respectively formed by an indium tin oxide (ITO) layer.

In a preferred embodiment of the present invention, the provided sensory structure includes a substrate having a first surface, a first electrode layer on the first surface, the first electrode layer being patterned to have plural island structures which are separately arranged on a first part of the first surface, an insulating layer covering on each of the island structures to expose a second part of the first surface, and a second electrode layer covering on the insulating layer and the second part of the first surface. Preferably, the first electrode layer and the second electrode layer are respectively constructed by plural mesh-typed electrode structures connected to a corresponding first trace having a plan width of less than 30 μm and a corresponding second trace.

Preferably, the mesh-typed electrode structures are made of metal having a relatively lower resistance than indium tin oxide, such as metallic silver or metallic stack of molybdenum/aluminum/molybdenum.

Preferably, the mesh-typed electrode structures are formed by an indium tin oxide (ITO) layer.

In a further preferred embodiment of the present invention, the provided sensory structure includes a substrate having a first surface, a first electrode layer having a first part thereon located on the first surface, an insulating layer located on the first part of the first electrode layer, plural through-holes formed within the insulating layer and passing therethrough so that the first electrode layer has a second part thereof located on the insulating layer and connected to the first part by the through-holes, and a second electrode layer patterned as being partially arranged on the insulating layer and separated from the second part of the first electrode layer. Preferably, the first electrode layer and the second electrode layer are respectively constructed by plural mesh-typed electrode structures connected to a corresponding first trace and a corresponding second trace having a plan width of less than 30 µm.

Preferably, the mesh-typed electrode structures are made of metal having a relatively lower resistance than indium tin oxide, such as metallic silver or metallic stack of molybdenum/aluminum/molybdenum.

Preferably, the mesh-typed electrode structures are formed by an indium tin oxide (ITO) layer.

According to the mentioned aspects of the present invention, a capacitive touch panel module is provided, which includes a substrate having a first surface and a second surface, a first electrode layer located on the first surface of the substrate and having plural first mesh-typed electrode structures separately arranged in a first direction, an insulating layer covering each of the first electrode structures, a second electrode layer located on the insulating layer and having plural second mesh-typed electrode structures separately arranged in a second direction and connected to a metal line having a plan width of less than 30 µm, and a black matrix layer located on the second surface of the substrate. The first direction and the second direction are different and corresponding to the black matrix layer.

Preferably, the provided capacitive touch panel further includes a filter layer located on the black matrix layer.

Preferably, the first electrode structures and the second electrode structures are formed by plural metallic traces.

Preferably, the first electrode layer and the second electrode layer are respectively one selected from an indium tin oxide layer or a metal layer having a relatively lower resistance than the indium tin oxide layer, such as a metallic layer of silver or a metallic layer stack of molybdenum/aluminum/molybdenum.

According to the mentioned aspects of the invention, the mesh-typed sensory structure is formed by plural connecting traces that are interlaced each other. Alternatively, the mesh-typed sensory structure is formed by plural zigzag-arranged connecting traces.

In the present invention, a mesh-typed sensory structure of capacitive touch panel having a bridge structure of double traces is provided by patterning a metal layer or an ITO layer. The connecting trace of these sensory structures is well-design so as to make the sensory structure invisible from external. Moreover, the sensory structure of the present invention is provided on the same substrate with the filter layer and the black matrix layer of touch panel to simplify panel structure, reduce the use of substrate, increase the transparency of touch panel and decrease the resistance thereof.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAILED DESCRIPTION OF THE PREFERRED EMBODIMENT

With reference to the following disclosures combined with the accompanying drawings, the sensory structure of capacitive touch panel according to the present invention is illustrated and understood. It should be noted that the accompanying drawings are provided only for illustration where the size or scale of the elements shown therein are not necessarily the actual one.

Figure 1:
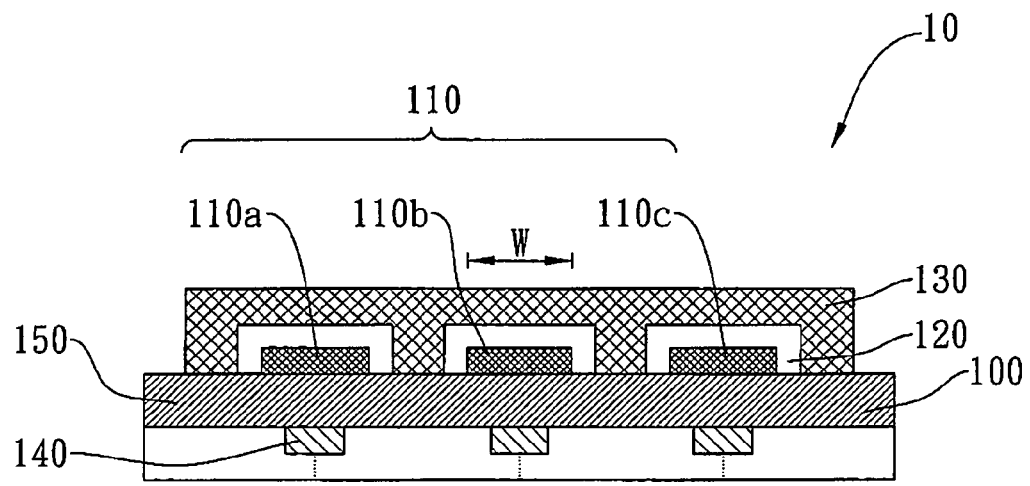
FIG. 1 is a cross-sectional view schematically showing a capacitive touch panel and sensory electrode thereof in accordance with a preferred embodiment of the present invention.

With reference to FIG. 1, the cross-sectional view of the capacitive touch panel and the sensory electrode thereof according to a preferred embodiment of the present invention is schematically illustrated. The capacitive touch panel 10 according to the present invention is essentially constructed by a substrate 100 and a first sensory electrode 110, an insulating layer 120 and a second sensory electrode 130 stacking on one side of the substrate 100. A black matrix layer 140 and a color filter layer 150 are formed on the other side of the substrate 100. Said first sensory electrode 110 is constructed by plural sensory structures 110a, 110b and 110c, which are parallel and extending to a same direction but not the same with that of the second sensory electrode 130. The insulating layer 120 is covering on said sensory structure 110a, 110b and 110c to form a sensory matrix of island type insulating dots. The stack of such insulating dot and the first and second sensory structures are referred to the bridge structure in the present invention, which connects sensory structures of same layer and insulates those of different layers.

In this case, the sensory electrode is directly formed onto the substrate 100 of color filter layer 150, and the position of sensory structure 110a, 110b, and 110c is corresponding to each of the black matrix zones on the black matrix layer 140 to obtain the capacitive touch panel module having integrated structure. Furthermore, the width of sensory structure W, e.g. the sensory structure 110a, 110b or 110, is chosen as less than 30 µm, so as to be invisible from external while maintaining the excellent conductivity.

Due to the fact that the resistance a conductive line may be increased as the width thereof reduces, the sensory structure according to the present invention is made of a metal material having a relatively lower resistance, e.g. lower than that of ITO. Preferably, the sensory stricture is made of silver (Ag), or is formed by a layer stack of molybdenum/aluminum/molybdenum (Mo/Al/Mo). Alternatively, sensory structures made from the transparent ITO layer are also applicable.

Figure 2:
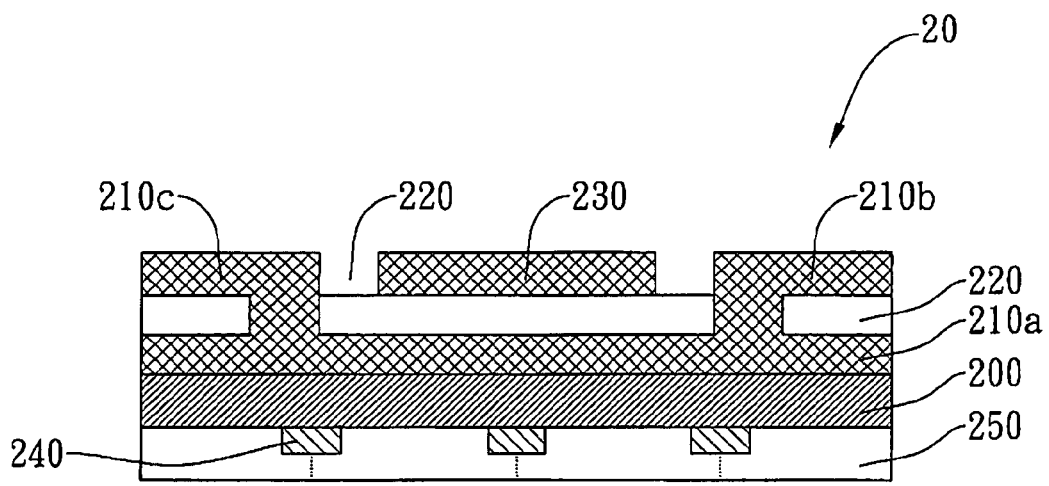
FIG. 2 is a cross-sectional view schematically showing a capacitive touch panel and the sensory electrode thereof in accordance with another preferred embodiment of the present invention.

With reference to FIG. 2, the cross-sectional view of the capacitive touch panel and another module of sensory electrode thereof according to another preferred embodiment of the present invention is schematically illustrated. The capacitive touch panel 20 of the present invention is constructed by a substrate 200 and a first sensory electrode 210, an insulating 220 and a second sensory electrode 230 stacking on one side of the substrate 200. A black matrix layer 240 and a color filter layer 250 are formed on the other side of the substrate 200. Said first sensory electrode 210 and said second sensory electrode are extending to different directions.

In this embodiment, the insulating layer 220 is formed onto a first part 210a of said first sensory electrode and having plural through-holes 210c by patterning process to connect through the first part 210a of first electrode layer and the second part 210b thereof, and then a sensory matrix having through-hole type insulating dots is obtained. The stack of such insulating dot and the first and second sensory structures are referred to the bridge structure in the present invention, which connects sensory structures of same layer and insulates those of different layers. Similarly, a sensory electrode is directly formed onto the substrate 200 of color filter layer 250 to obtain a capacitive touch panel module having integrated structure.

In the present invention, the first sensory electrode and the second sensory electrode are formed by an electrode structure (such as metallic Ag trace), or a patterned ITO transparent layer, or the combination thereof, or the layer stack of molybdenum/aluminum/molybdenum (Mo/Al/Mo).

Figure 3:
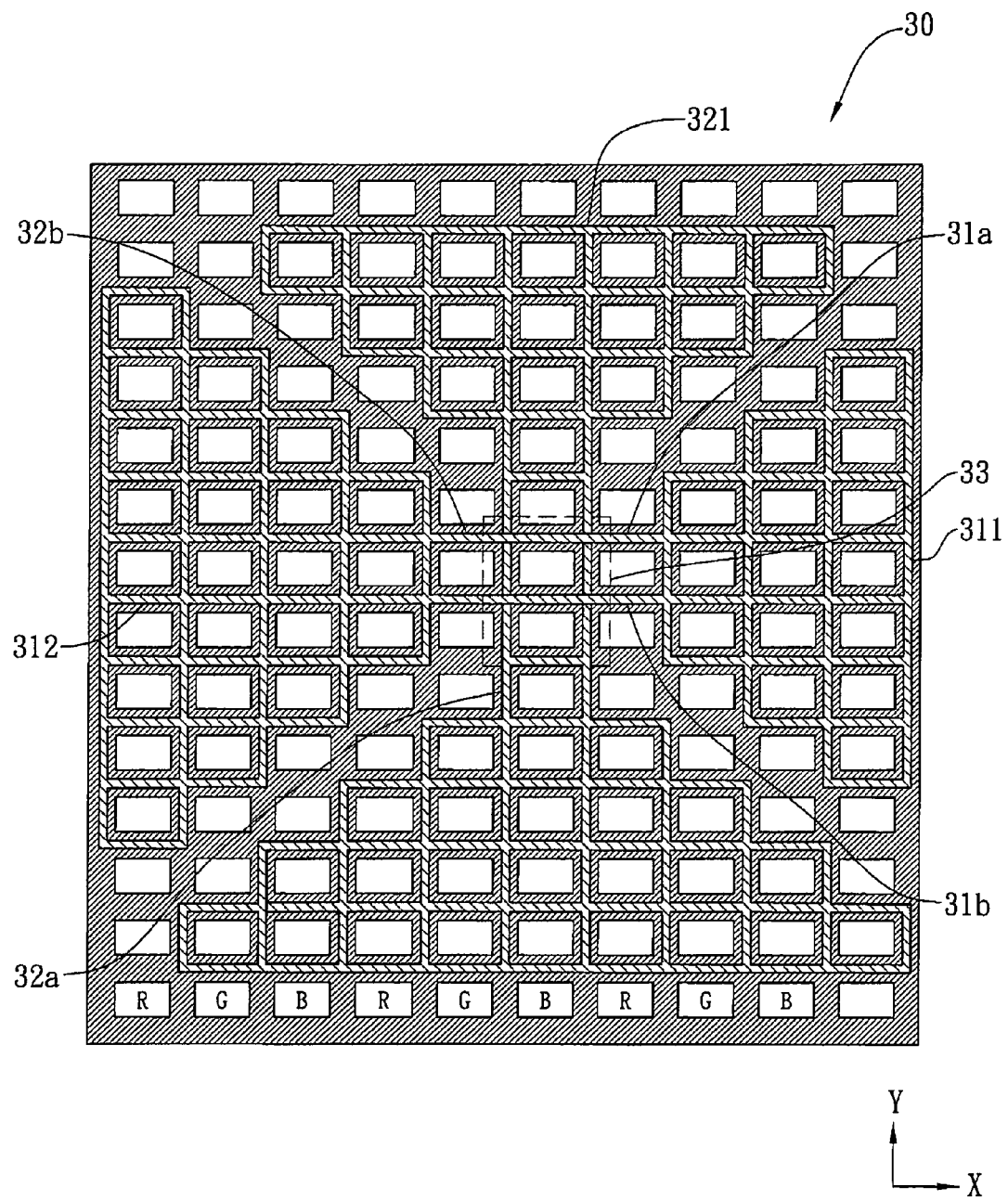
FIG. 3 is a top view schematically showing a sensory structure in accordance with a preferred embodiment of the present invention.

With reference to FIG. 3, a top view of a sensory structure according to a preferred embodiment of the present invention is schematically illustrated.

As described above, the sensory structure of the present invention is formed onto the substrate of black matrix layer and the color filter layer composed of R, G, B pixels, and the orientation thereof is corresponding to the black matrix layer. As shown in FIG. 3, the sensory structure of the present invention is comprised of plural sensory units 30. Each of the sensory units 30 is constructed alternatively by a group of first connecting traces 31a, 31b and a group of second connecting traces 32a, 32b. The first connecting traces 31a, 31b and second connecting traces 32a, 32b are extending to a first direction (such as X-axis) and a second direction (such as Y-axis), respectively. The width of the first connecting trace 31a or 31b is chosen as less than 30 µm, so as to be invisible from external while maintaining the excellent conductivity. A bridge structure 33 is formed at the junction of the first connecting traces 31a, 31b and the second connecting traces 32a, 32b. The bridge structure 33 is made of a stack of metal layer and insulating layer by any conventional process to connect sensory structures of same layer and to insulate those of different layers. In this embodiment, the sensory unit 30 is constructed by four identical mesh-typed sensory structures 311, 312, 321 and 322, wherein the mesh-typed sensory structures 311 and 312, which are formed by a plurality of connecting traces that are interlaced each other, are connected to the first connecting trace 31a and 31b, and arranged along the direction thereof at opposite sides of the bridge structure 33 to form the sensory unit 30 symmetric horizontally and vertically. Said sensory units 30, connecting traces 31a, 31b, 32a, 32b, bridge structure 33 and mesh-typed sensory structure 311, 312, 321, 322 are formed by metal electrode structure (such as metallic Ag trace), or patterned ITO transparent electrode layer, or the combination thereof, or the layer stack of molybdenum/aluminum/molybdenum (Mo/Al/Mo).

Figure 4:
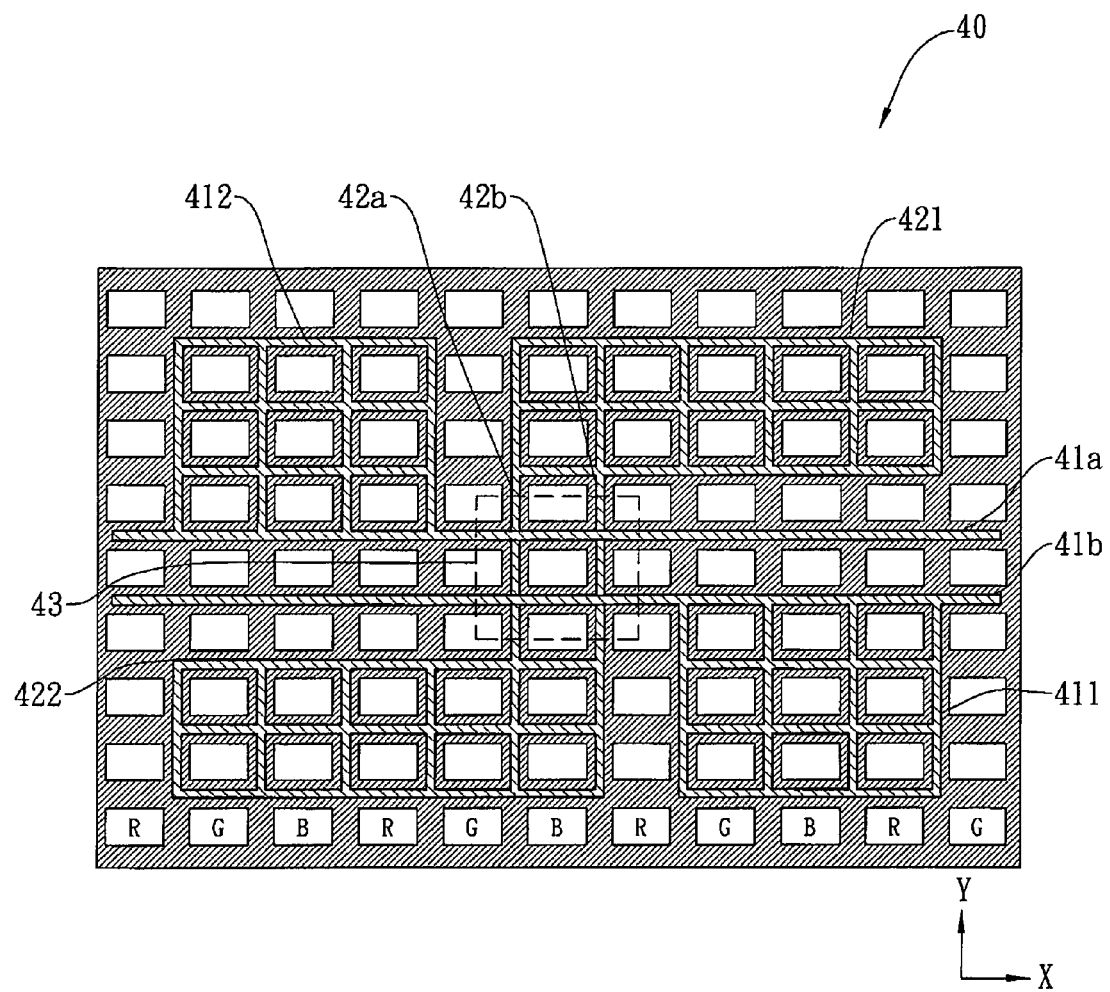
FIG. 4 is a top view schematically showing a sensory structure in accordance with a further preferred embodiment of the present invention.

In the present invention, the mesh-typed sensory structure could also be arranged to form sensory units in other symmetric manners besides the above mentioned ones. With reference to FIG. 4, the top view of sensory structure according to a preferred embodiment of the present invention is schematically illustrated. As shown in FIG. 4, the sensory structure of the present invention is formed by plural sensory units 40. Each of the sensory units 40 is essentially constructed by a group of first connecting traces 41a, 41b and a group of second connecting traces 42a, 42b. The first connecting traces 41a, 41b and second connecting traces 42a, 42b are extending to a first direction (such as X-axis) and a second direction (such as Y-axis), respectively. The width of the first connecting trace 41a or 41b is chosen as less than 30 µm, so as to be invisible from external while maintaining the excellent conductivity. A bridge structure 43 is formed at the junction of the first connecting traces 41a, 41b and the second connecting traces 42a, 42b to connect sensory structures of same layer and to insulate those of different layers. The connecting traces 41a, 41b, 42a, 42b and the bridge structure 43 are made of a stack of metal layer and insulating layer by any conventional process. In this embodiment, the sensory unit 40 is constructed by four mesh-typed sensory structures 411, 412, 421 and 422. The mesh-typed sensory structures 411 and 412, which are formed by a plurality of connecting traces that are interlaced each other, are identical and connected to both sides of the first connecting trace 41a and 41b, and the other two identical mesh-typed sensory structures 421 and 422, which are formed by a plurality of connecting traces that are interlaced each other, are connected to both sides of the second connecting traces 42a and 42b, so that a pair of rotationally symmetric sensory units 40 is obtained. Similarly, said sensory units 40, connecting traces 41a, 41b, 42a, 42b, bridge structure 43 and mesh-typed sensory structure 411, 412, 421, 422 are formed by metal electrode structure (such as metallic Ag trace), patterned ITO transparent electrode layer, or the combination thereof, or the layer stack of molybdenum/aluminum/molybdenum (Mo/Al/Mo).

In the embodiments shown in FIG. 3 and FIG. 4, the mesh-typed sensory structure is formed by plural connecting traces that are interlaced each other. In a further embodiment, the mesh-typed sensory structure is formed by plural zigzag-arranged connecting traces, as shown in FIG. 5.

Figure 5:
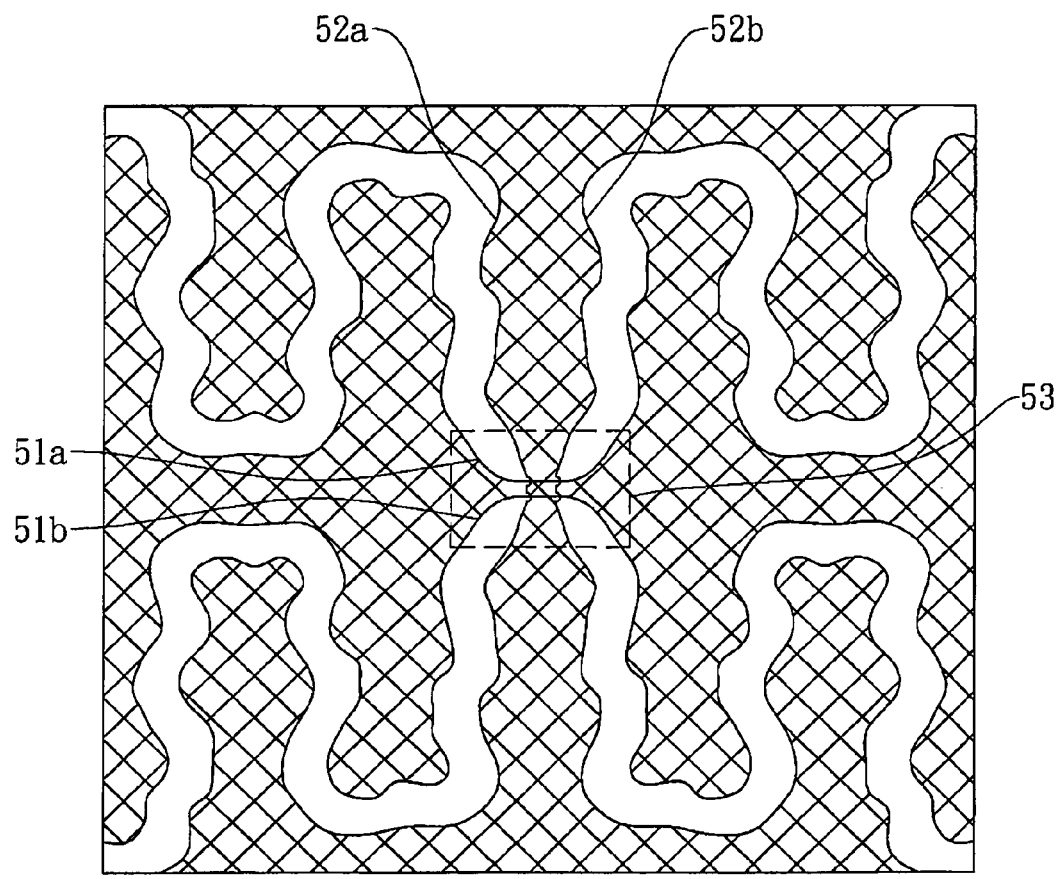
FIG. 5 is a top view schematically showing a sensory structure in accordance with still another preferred embodiment of the present invention.

Referring to FIG. 5, the top view of sensory structure according to a preferred embodiment of the present invention is schematically illustrated. This embodiment is different from that as shown in FIG. 4 in that the connecting traces of respective sensory structures are zigzag-arranged, i.e. the so-called zigzag-arranged connecting traces 51a, 51b, 52a and 52b, rather than interlaced ones. Similarly, the bridge structure 53, having the form of stack of metal layer and insulating layer as shown in either FIG. 1 or FIG. 2, is formed at the junction of the first connecting zigzag-arranged connecting traces 51a, 51b and the zigzag-arranged connecting traces 52a, 52b to connect sensory structures of same layer and to insulate those of different layers.

Optionally, in the region defined between the respective two zigzag-arranged connecting lines 51a, 51b and 52a, 52b, the mesh-typed sensory sub-structures are formed. Such pattern of sensory structure improves the sensitivity and response period for the touch panel. Furthermore, the pattern of sensory structure shown in FIG. 5 is just an example of embodiments but not for limiting the scope. It should be understood that any type of sub-structure constituting a two-dimensional sensory is applicable in this present invention.

Figure 6:
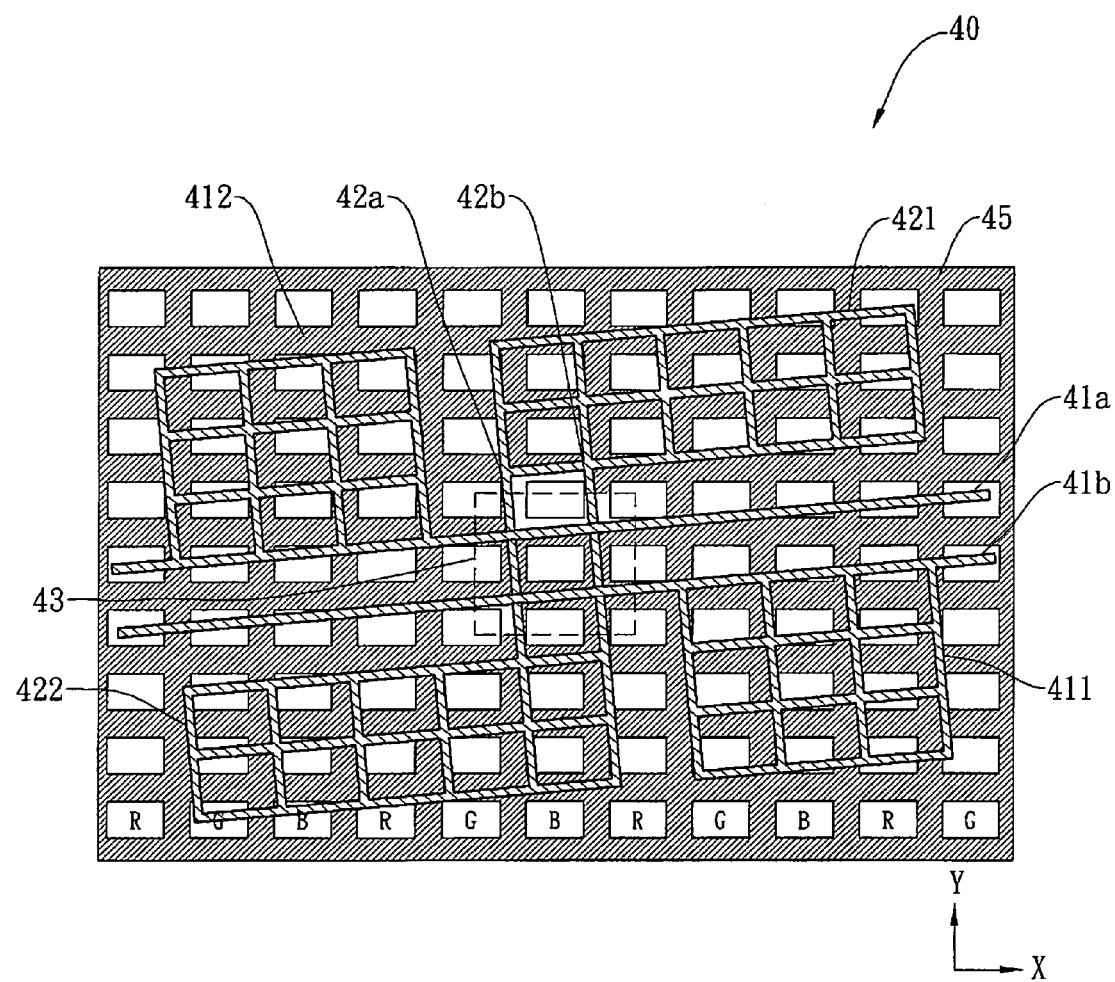
FIG. 6 is a top view schematically showing a sensory structure in accordance with still another preferred embodiment of the present invention.

In the mentioned embodiments, the black matrix layer of the capacitive touch panel module is oriented in such a way that the BM patterns of the black matrix layer exactly cover the connecting traces of the sensory structures to make them invisible. Alternatively, since the width of connecting traces of the present invention is relatively reduced, it is also applicable that the black matrix layer is angled with respect to the connecting traces at such as 30 degrees, so that the undesired moiré pattern can be avoided. FIG. 6 schematically shows such configuration of the sensory structure, in which the pattern of the sensory unit, containing the connecting traces 41a, 41b, 42a, 42b and sensory structures 411, 412, 421, 422, is angled with respect the black matrix layer 45 at a desired angle.

In the present invention, a novel mesh-typed sensory structure of capacitive touch panel is provided to replace the conventional single panel sensory structure, and the touch panel obtained therefrom has high transparency. In a preferred embodiment, metal traces are used to form mesh-typed structure to greatly reduce the resistance of the sensory structure. Besides, the mesh-typed sensory structure of the present invention is composed of multiple metal traces, which are distributed around the R, G, B pixels of color filter layer along the X-axis and Y-axis of a panel. Therefore, when one of the metal traces in the sensory structure fails, the circuit is still connected by other traces to maintain the function of sensory structure. The mesh-typed sensory structure of capacitive touch panel of the present invention is formed by a metal layer or an patterned ITO layer, and having double trace bridge structure, and further more provided on the same substrate with the color filter layer and the black matrix layer of touch panel, which could simplify the panel structure, reduce the use of substrate, then increase the transparency of touch panel and decrease the resistance thereof.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A sensory structure of a touch panel, comprising:
   a substrate having a first surface;
   a first electrode layer having a first part thereon located on said first surface;
   an insulating layer located on said first part of said first electrode layer;
   plural through-holes formed within said insulating layer and passing therethrough, wherein said first electrode layer has a second part thereof located on said insulating layer and connected to said first part by said through-holes; and
   a second electrode layer patterned as being partially arranged on said insulating layer and separated from said second part of said first electrode layer,
   wherein said first electrode layer and said second electrode layer are respectively constructed by plural mesh-typed electrode structures connected to a corresponding first trace and a corresponding second trace having a plan width of less than 30 μm.

* * * * *